United States Patent
Ishikawa (10) Patent No.: US 8,395,728 B2
(45) Date of Patent: Mar. 12, 2013

(54) LIQUID CRYSTAL DISPLAY APPARATUS

(75) Inventor: Yoshimitsu Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 235 days.

(21) Appl. No.: 13/012,177

(22) Filed: Jan. 24, 2011

(65) Prior Publication Data
US 2012/0069276 A1 Mar. 22, 2012

(30) Foreign Application Priority Data
Sep. 16, 2010 (JP) .................................. 2010-207821

(51) Int. Cl.
*G02F 1/1335* (2006.01)
(52) U.S. Cl. ............................ 349/103; 349/96; 349/15
(58) Field of Classification Search .................... 349/96, 349/97, 98, 99, 102, 103, 15, 16, 8, 9
See application file for complete search history.

(56) References Cited

U.S. PATENT DOCUMENTS

| | | | | |
|---|---|---|---|---|
| 4,876,536 A | * | 10/1989 | Matai et al. | 340/7.61 |
| 6,573,928 B1 | | 6/2003 | Jones et al. | |
| 7,898,628 B2 | | 3/2011 | Ishikawa et al. | |
| 8,134,659 B2 | * | 3/2012 | Takahashi et al. | 349/96 |
| 8,203,673 B2 | * | 6/2012 | Uesaka et al. | 349/96 |
| 2003/0117489 A1 | | 6/2003 | Jones et al. | |
| 2007/0263145 A1 | | 11/2007 | Ishikawa et al. | |
| 2008/0013017 A1 | | 1/2008 | Ishikawa et al. | |
| 2008/0117365 A1 | | 5/2008 | Maeda | |
| 2012/0069276 A1 | * | 3/2012 | Ishikawa | 349/103 |

FOREIGN PATENT DOCUMENTS

| | | |
|---|---|---|
| JP | 2004-312780 | 11/2004 |
| JP | 2008-8934 | 1/2008 |

* cited by examiner

*Primary Examiner* — Brian Healy
(74) *Attorney, Agent, or Firm* — Oblon, Spivak, McClelland, Maier & Neustadt, L.L.P.

(57) ABSTRACT

In a liquid crystal display apparatus in which a liquid crystal layer is twist-aligned when no electric field is applied, $\Delta$nd value of a liquid crystal layer in a wavelength of 550 nm is 300 to 400 nm, each of directions of polarizing axes of pair of linear polarizers is substantially parallel or vertical to the alignment direction of liquid crystal molecules in each end face of the liquid crystal layer that is closer to each of linear polarizers, and the angle between polarizing axes of the pair of linear polarizers is 85° or larger and smaller than 90°. In a liquid crystal display apparatus in which a liquid crystal layer is aligned to be substantially vertical when no electric field is applied, the angle between polarizing axes of the pair of linear polarizers is 85° or larger and smaller than 90°. In a liquid crystal display apparatus of a lateral electric field drive system, a uniaxial alignment angle of a liquid crystal layer when no electric field is applied is larger than −45° and −40° or smaller, or +40° or larger and smaller than +45°.

6 Claims, 9 Drawing Sheets

FRONTAL VISUAL FIELD         SLANTED VISUAL FIELD

Fig. 5

FRONTAL VISUAL FIELD         SLANTED VISUAL FIELD

LIQUID CRYSTAL DISPLAY APPARATUS

INCORPORATION BY REFERENCE

This application is based upon and claims the benefit of priority from Japanese patent application No. 2010-207821, filed on Sep. 16, 2010, the disclosure of which is incorporated herein in its entirety by reference.

BACKGROUND OF THE INVENTION

1. Field of the Invention

The present invention relates to a liquid crystal display apparatus.

2. Description of Related Art

A liquid crystal display apparatus is used as a monitor of a personal computer (PC), a personal digital assistant device and the like, or a display apparatus of a TV, taking advantages of its low power consumption or reduced size and light weight. A liquid crystal display apparatus includes a plurality of pixels arranged in matrix, and displays images by performing light modulation for each pixel.

An active matrix type liquid crystal display apparatus using a thin film transistor (TFT) as a switching element is widely used as a liquid crystal display apparatus.

Japanese Unexamined Patent Application Publication No. 2004-312780 (patent document 1) and Japanese Unexamined Patent Application Publication No. 2008-8934 (patent document 2) each disclose a liquid crystal display apparatus of parallax barrier system with multi screen that includes a parallax barrier layer in a viewing side of a liquid crystal panel and is capable of displaying different images at the same time to a plurality of observers in different visual directions by one liquid crystal display apparatus.

Figure 13:
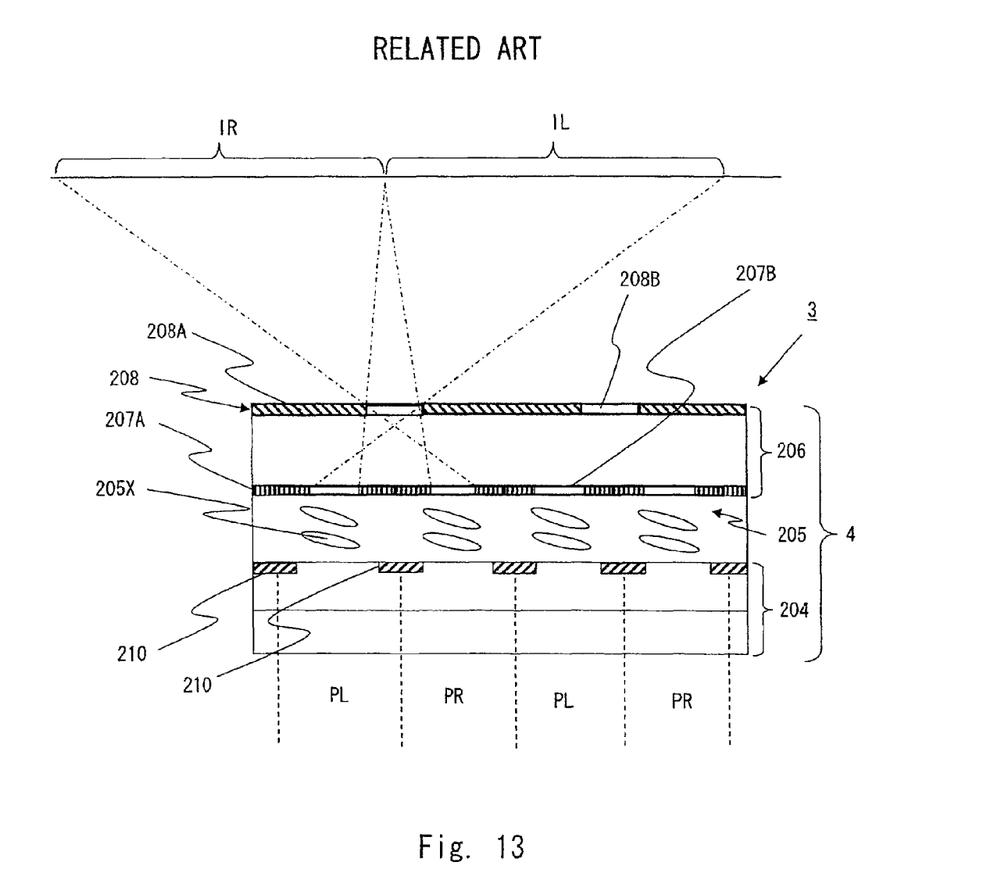
FIG. 13 is a schematic cross sectional view of a liquid crystal display apparatus of parallax barrier system with multi screen according to a related art.

Referring to FIG. 13, a basic configuration of a TFT liquid crystal display apparatus of conventional parallax barrier system is described. FIG. 13 shows a schematic cross sectional view. This example will be described taking a right and left two-screen display as an example that displays different images to observers in the left side and the right side with respect to the display screen.

A liquid crystal display apparatus 3 shown in FIG. 13 includes a liquid crystal panel 4 in which a TFT substrate 204 and an opposed substrate (CF substrate) 206 are bonded to each other with a liquid crystal layer 205 interposed therebetween. The TFT substrate 204 includes a pixel electrode (not shown) and a TFT (not shown) formed for each pixel. The TFT substrate 204 further includes a plurality of signal lines 210 including a plurality of gate lines (scan signal lines) and a plurality of source lines (display signal lines) to drive the display apparatus at each pixel, and a plurality of lead-out lines (not shown) connected to the plurality of signal lines 210. The opposed substrate 206 includes an opposed electrode (common electrode), a colored layer (color filter layer, not shown) of red (R)/green (G)/blue (B), and a light shielding layer (BM) 207A that shields the light between adjacent pixels formed therein.

In FIG. 13, the reference symbol 205X schematically shows liquid crystal molecules in the liquid crystal layer 205.

In the opposed substrate 206, a clearance between adjacent light shielding layers (BM) 207A is a pixel opening part 207B.

In the liquid crystal panel 4, the plurality of pixels arranged in matrix are divided into pixels PL that display data for left visual field with respect to the display screen and pixels PR that display data for right visual field with respect to the display screen.

As shown in FIG. 13, when seen in the cross-sectional view, the pixel PL for left visual field and the pixel PR for right visual field are alternately arranged.

For example, seen in a plane view, a pixel group for left visual field in line composed of a plurality of pixels PL for left visual field arranged in line and a pixel group for right visual field in line composed of a plurality of pixels PR for right visual field arranged in line are alternately arranged in stripe.

A parallax barrier layer 208 including a light shielding part 208A and an opening part 208B is formed in a viewing side of the opposed substrate 206.

The position of the pixel opening part 207B formed between adjacent light shielding layers (BM) 207A and the position of the opening part 208B formed in the parallax barrier layer 208 are deviated from each other. Specifically, the opening part 208B of the parallax barrier layer 208 is positioned between the pixel opening part 207B of the pixel PL for left visual field and the pixel opening part 207B of the pixel PR for right visual field that are adjacent to each other.

In the liquid crystal display apparatus 3, display data from the pixel PL for left visual field passes through the pixel opening part 207B of the pixel PL for left visual field and the opening part 208B of the parallax barrier layer 208, and is selectively emitted to the left side with respect to the display screen. Hence, a display image IL for left visual field can be observed by an observer in the left side with respect to the display screen.

Similarly, display data from the pixel PR for right visual field passes through the pixel opening part 207B of the pixel PR for right visual field and the opening part 208B of the parallax barrier layer 208, and is selectively emitted to the right side with respect to the display screen. Hence, a display image IR for right visual field can be observed by an observer in the right side with respect to the display screen.

In the liquid crystal display apparatus 3, the distance between the light shielding layer (BM) 207A and the parallax barrier layer 208, and the opening position and the opening diameter of the pixel opening part 207B and the opening part 208B of the parallax barrier layer 208 are designed so that the plurality of images IL and IR are displayed while being separated in angle as described above.

A liquid crystal display apparatus of parallax barrier system with right and left two screens has a problem of crosstalk, which means the incomplete isolation of the display image IL for left visual field and the display image IR for right visual field so that a part of a display image leaks into the other display image.

In particular, one display image tends to leak into the other display image in the range of the visual angle in the neighborhood of the boundary of two display images. Furthermore, particularly in a display image with much black display, even a small amount of leakage of the other display image tends to be visualized as leaked image.

When the level of crosstalk is high, a part of the display image that should be seen by one observer in one side with respect to the display screen enters the display image that should be seen by the other observer in the other side with respect to the display screen. Thus, display defects occur in which the two display images are overlapped.

The above-stated problem is not limited in the liquid crystal display apparatus with right and left two screens, but the same problem occurs in any liquid crystal display apparatus of parallax barrier system with multi screen.

To address with the problem of crosstalk stated above in which a plurality of display images are mixed in a liquid crystal display apparatus of parallax barrier system with multi screen, patent document 1 discloses a crosstalk correction image generation method to estimate the influence of crosstalk in advance and write the crosstalk corrected potential based on this data into a pixel electrode (see e.g., Claims 1 to 4, and Abstract).

Further, patent document 2 arranges a plurality of parallax barrier layers (33, 36) to reduce crosstalk (see, e.g., Claim 1 and FIG. 1).

However, the method of patent document 1 does not suppress the occurrence of crosstalk itself. It is required in the method of patent document 1 to calculate the correction amount by estimating the crosstalk in advance and to execute the calculated correction amount in a drive circuit, which complicates the circuit configuration.

The method of patent document 2 requires arrangement of a plurality of parallax barrier layers, which increases the cost.

Further, a liquid crystal display apparatus typically has visual angle dependencies, and display properties such as a contrast ratio (CR) are different between a case in which the display screen is seen from the front and a case in which the display screen is seen from a slanted direction. A liquid crystal display apparatus with single screen typically used in TVs or PC monitors has smaller CR with increasing angle from the front with respect to the display screen.

It is not usually assumed that the liquid crystal display apparatus of parallax barrier system with multi screen is used in the frontal visual field. It is usually assumed that the liquid crystal display apparatus is used in the slanted direction. For example, in a liquid crystal display apparatus with right and left two screens, a desired visual field may often be the range in which the visual angle is moved by about 20 to 50° in the left side and the right side from the front.

Accordingly, when the above typical liquid crystal display apparatus with single screen in which the CR decreases in the slanted visual field is directly applied to the liquid crystal display apparatus with multi screen, display properties such as CR and gamma characteristic are degraded since the liquid crystal display apparatus is used with low CR of the liquid crystal display apparatus itself in the slanted visual field, which is supposed to be the main state of usage.

The problem state above that the CR decreases in the slanted visual field can be solved to some extent by using a lateral electric field drive system of IPS (In-Plane Switching) mode or FFS (Fringe Field Switching) mode having the most excellent viewing angle characteristic.

However, when a liquid crystal mode of a lateral electric field drive system in which excellent CR can be obtained in a wide range of visual field is applied to the liquid crystal display apparatus with multi screen, this causes visual fields with degraded display properties due to the crosstalk of a plurality of display images. This is because, when a part of the display image that should be seen by one observer in one side with respect to the display screen enters the display image that should be seen by the other observer in the other side with respect to the display screen, the influence of the mixed display image increases if the luminance level of the display image which should be seen by the observer is low.

SUMMARY OF THE INVENTION

The present invention has been made in view of those circumstances, and aims to provide a liquid crystal display apparatus of parallax barrier system that is capable of reducing crosstalk in a plurality of display images in a desired visual field, without complicating the circuit configuration and without requiring a plurality of parallax barrier layers, with low cost, high contrast ratio, and excellent visibility.

While the present invention is effective for a liquid crystal display apparatus of parallax barrier system, it is applicable to any liquid crystal display apparatus with a desired visual field of the slanted direction with respect to the display screen.

A first exemplary aspect of an embodiment of the present invention is a liquid crystal display apparatus including a liquid crystal layer; a pair of substrates that are arranged opposite to each other with the liquid crystal layer interposed therebetween, each of the substrates including an electrode to apply an electric field to the liquid crystal layer; and a pair of linear polarizers that are arranged outside the pair of substrates, each of the linear polarizers selectively transmitting specific linearly-polarized light, in which the liquid crystal layer is twist-aligned when no electric field is applied, and has a $\Delta nd$ value of 300 nm or larger and 400 nm or smaller, the $\Delta nd$ value being a product of a refractive anisotropy $\Delta n$ and a thickness of a liquid crystal layer d in a wavelength of 550 nm, each of directions of polarizing axes of the pair of linear polarizers is substantially parallel or substantially vertical to the alignment direction of liquid crystal molecules in each end face of the liquid crystal layer that is closer to each of the linear polarizers, and the angle between the polarizing axes of the pair of linear polarizers is 85° or larger and smaller than 90°.

In this specification, "a polarizing axis of a linear polarizer" indicates a polarizing axis of a specific linearly-polarized light that is selectively transmitted.

In this specification, unless otherwise noted, "substantially parallel" is defined to be within the range of ±5° with respect to the state of complete parallel, and "substantially vertical" is defined to be within the range of ±5° with respect to the state of complete vertical.

Furthermore, unless otherwise specified, "about" in angle notations refers to the range of ±5° of the angle that is described.

A second exemplary aspect of an embodiment of the present invention is a liquid crystal display apparatus including a liquid crystal layer; a pair of substrates that are arranged opposite to each other with the liquid crystal layer interposed therebetween, each of the substrates including an electrode to apply an electric field to the liquid crystal layer; and a pair of linear polarizers that are arranged outside the pair of substrates, each of the linear polarizers selectively transmitting specific linearly-polarized light, in which the liquid crystal layer is aligned to be substantially vertical when no electric field is applied, and the angle between polarizing axes of the pair of linear polarizers is 85° or larger and smaller than 90°.

A third exemplary aspect of an embodiment of the present invention is a liquid crystal display apparatus of a lateral electric field drive system including a liquid crystal layer; a pair of substrates that are arranged opposite to each other with the liquid crystal layer interposed therebetween; a pair of linear polarizers that are arranged outside the pair of substrates, each of the linear polarizers selectively transmitting specific linearly-polarized light; and a pair of electrodes that are included in one substrate of the pair of substrates, the electrodes applying lateral electric field to the liquid crystal layer, in which the liquid crystal layer is uniaxially aligned when no electric field is applied, and the uniaxial alignment angle is larger than −45° and −40° or smaller, or +40° or larger and smaller than +45° (the "angle" here is a value based on 0° which is the direction of three-o'clock of a clock seen from a front with respect to a display screen, the counterclockwise direction from 0° being "+", and the clockwise direction from 0° being "−"), and the direction of the polarizing axes of the pair of linear polarizers is substantially parallel or substantially vertical to the uniaxial alignment direction of the liquid crystal layer.

The liquid crystal display apparatus of the lateral electric field drive system includes, for example, a liquid crystal display apparatus of IPS (In-Plane Switching) mode or FFS (Fringe Field Switching) mode.

According to the first to third exemplary aspects of the present invention, the liquid crystal display apparatus is preferably applicable to a display apparatus of parallax barrier system with multi screen including at least one parallax barrier layer provided in a substrate in a viewing side of the pair of substrates, the parallax barrier layer performing adjustment so that each display data from each of pixels forming the liquid crystal display apparatus is selectively emitted to a visual field of a specific angle range, to perform adjustment so that different display images are displayed on a plurality of visual fields having different angle ranges.

The present invention aims to provide a liquid crystal display apparatus of parallax barrier system that is capable of reducing crosstalk in a plurality of display images in a desired visual field, without complicating the circuit configuration and without requiring a plurality of parallax barrier layers, with low cost, high contrast ratio, and excellent visibility.

While the present invention is effective for a liquid crystal display apparatus of parallax barrier system, it is applicable to any liquid crystal display apparatus with a desired visual field of the slanted direction with respect to the display screen, and is capable of providing a liquid crystal display apparatus with high contrast ratio and excellent visibility.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Exemplary Embodiment

Referring to the drawings, a liquid crystal display apparatus of parallax barrier system with multi screen according to a first exemplary embodiment of the present invention will be described. The first exemplary embodiment will be described taking a right and left two-screen display as an example. The first exemplary embodiment will be described taking an active matrix type liquid crystal display apparatus using a TFT as a pixel switching element as an example.

Figure 1:
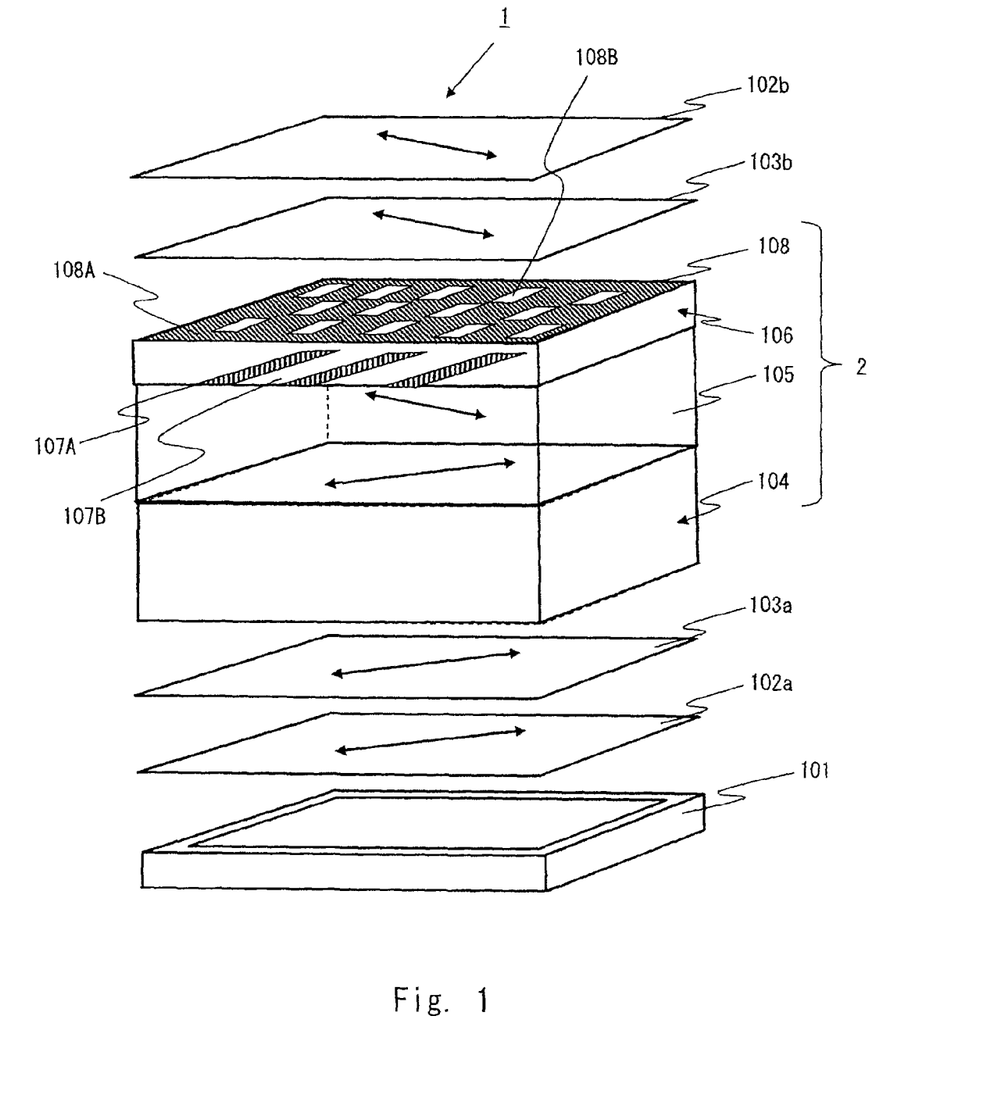
FIG. 1 is a schematic exploded perspective view of a liquid crystal display apparatus of parallax barrier system with multi screen according to a first exemplary embodiment of the present invention.
Figure 2:
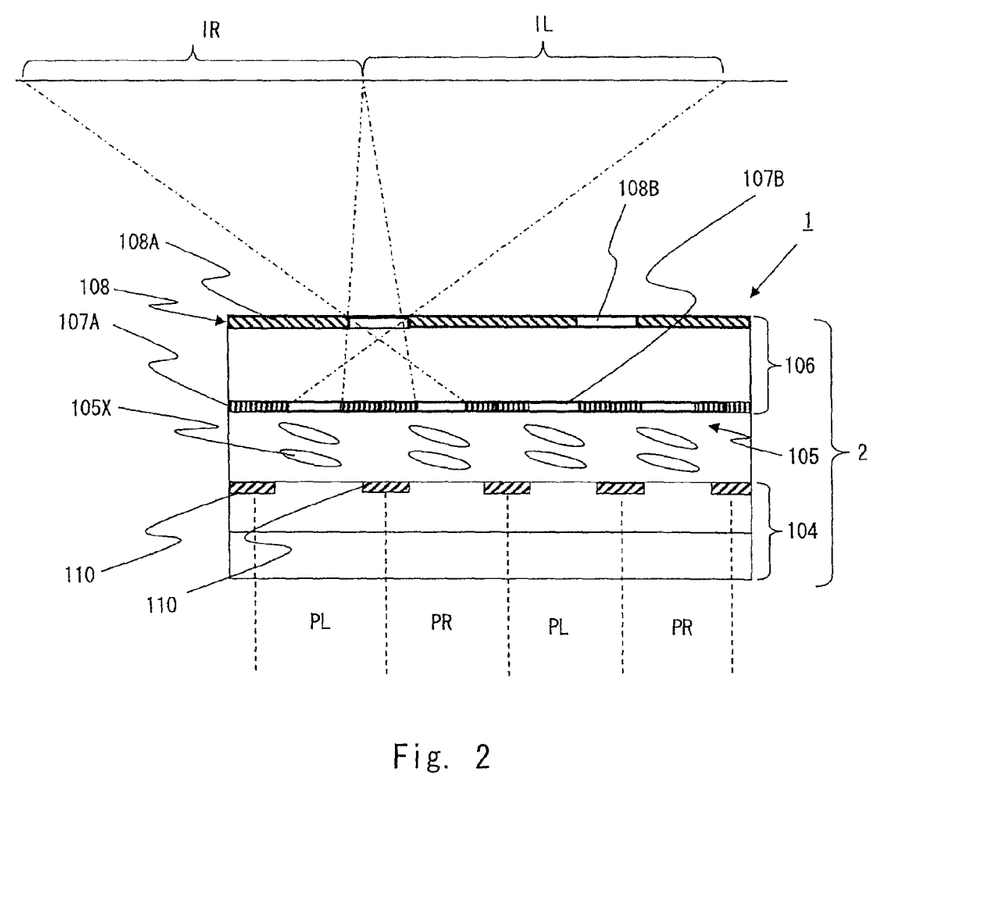
FIG. 2 is a schematic cross sectional view specifically showing main constitutional elements of the liquid crystal display apparatus shown in FIG. 1.
Figure 3A:
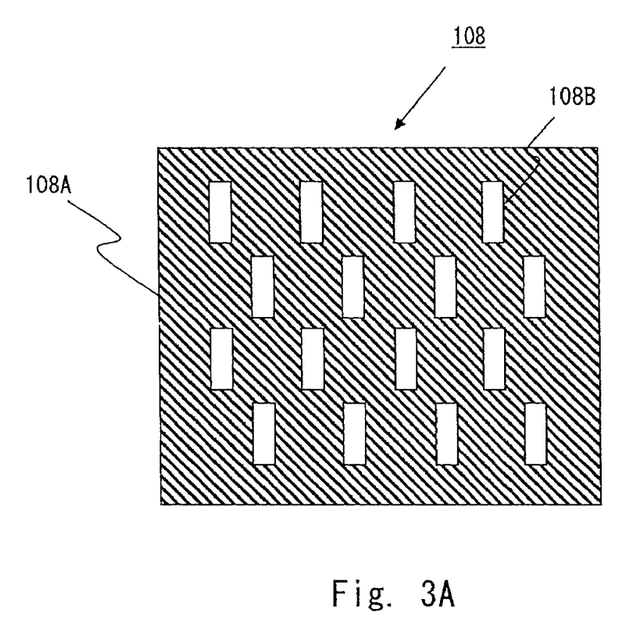
FIG. 3A is a diagram showing an example of a plane pattern of a parallax barrier layer of the liquid crystal display apparatus shown in FIG. 1.
Figure 3B:
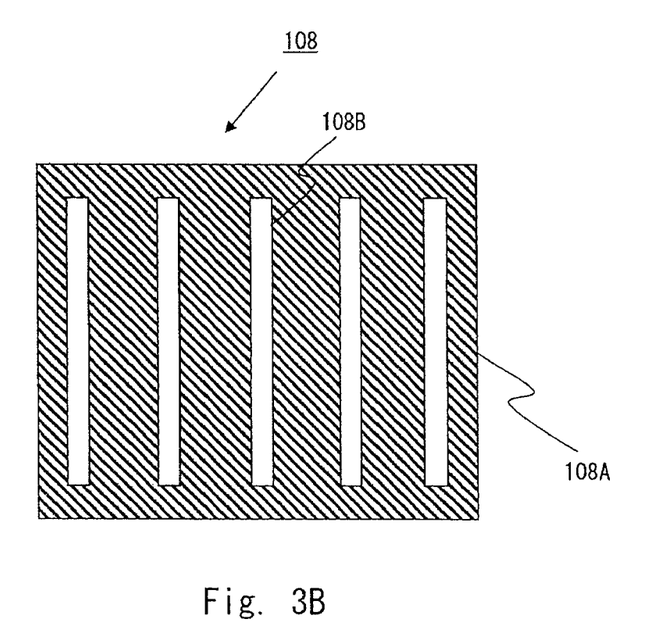
FIG. 3B is a diagram showing an example of a plane pattern of the parallax barrier layer of the liquid crystal display apparatus shown in FIG. 1.

FIG. 1 is a schematic exploded perspective view of a liquid crystal display apparatus according to the first exemplary embodiment. FIG. 2 is a schematic cross sectional view specifically showing main constitutional elements of the liquid crystal display apparatus according to the first exemplary embodiment. FIGS. 3A and 3B each show an example of a plane pattern of a parallax barrier layer.

The arrows shown in FIG. 1 indicate a direction in which a liquid crystal layer 105 is aligned, absorption axes of linear polarizers 102a and 102b, and a direction in which viewing angle compensation films 103a and 103b are aligned.

For the sake of clear illustration, each constitutional element is not drawn to scale and its position is different from actual one, and a part of the constitutional elements is omitted. Hatching is omitted in the cross sectional view as appropriate.

As shown in FIG. 1, a liquid crystal display apparatus 1 according to the first exemplary embodiment is a transmissive liquid crystal display apparatus including a back light (BL) 101 including a light source, a light-guide plate and the like. The liquid crystal display apparatus 1 according to the first exemplary embodiment includes a liquid crystal panel 2 of twisted nematic liquid crystal (TN) mode in which the liquid crystal layer 105 is twist-aligned by about 90° when no electric field is applied. As shown in FIG. 2, the liquid crystal panel 2 includes a plurality of pixels PL and PR arranged in matrix.

As shown in FIGS. 1 and 2, the liquid crystal panel 2 includes a TFT substrate 104 in the side of the BL 101, an opposed substrate (CF substrate) 106 in the viewing side, and a liquid crystal layer 105 disposed between the pair of substrates. The TFT substrate 104 and the opposed substrate 106 are bonded with a seal material (not shown) applied to peripheral parts of these substrates, and the liquid crystal layer 105 is included inside the seal material.

The TFT substrate 104 includes, for each of the pixels, a pixel electrode (not shown) and a TFT (Thin Film Transistor, not shown) as a switching element formed on a translucent substrate such as a glass substrate. The TFT substrate 104 further includes a plurality of signal lines 110 composed of a plurality of gate lines (scan signal lines) and a plurality of source lines (display signal lines) to drive the display apparatus at each pixel, and a plurality of lead-out lines (not shown) connected to the plurality of signal lines 110. Further, the TFT substrate 104 includes an alignment film (not shown) formed on the outermost surface on the side of the liquid crystal layer 105.

The opposed substrate 106 includes an opposed electrode (common electrode, not shown), a colored layer (color filter layer, not shown) of red (R)/green (G)/blue (B), and a light shielding layer (BM) 107A that shields light between adjacent electrodes formed on a translucent substrate such as a glass substrate. Further, the opposed substrate 106 includes an alignment film (not shown) formed on the outermost surface on the side of the liquid crystal layer 105.

In the opposed substrate 106, a pixel opening part 107B is formed between adjacent light shielding layers (BM) 107A.

The whole thickness of the opposed substrate 106 is about 0.1 mm, and a parallax barrier layer 108 is provided in the viewing side of the opposed substrate 106 (opposite side to the liquid crystal layer 105).

The alignment of liquid crystal molecules 105X in the end face of the liquid crystal layer 105 in the BL side (lower end face in FIG. 2) is defined by the direction of rubbing of the alignment film on the side of the TFT substrate 104 when no electric field is applied. Similarly, the alignment of the liquid crystal molecules 105X in the end face of the liquid crystal layer 105 in the viewing side (upper end face in FIG. 2) is defined by the direction of rubbing of the alignment film on the side of the opposed substrate 106 when no electric field is applied.

In FIG. 2, the symbol 105X schematically shows liquid crystal molecules in the liquid crystal layer 105. While being simplified in FIG. 2, the liquid crystal molecules 105X in the liquid crystal layer 105 are actually twist-oriented by about 90° in the thickness direction when no electric field is applied.

When an electric field is applied between the pixel electrode of the TFT substrate 104 and the opposed electrode (common electrode) of the opposed substrate 106, the alignment of the liquid crystal molecules 105X in the liquid crystal layer 105 is changed.

As shown in FIG. 2, in the liquid crystal panel 2, the plurality of pixels arranged in matrix are divided into pixels PL displaying left visual field data with respect to the display screen, and pixels PR displaying right visual field data with respect to the display screen.

In the first exemplary embodiment, pixels PL for left visual field and pixels PR for right visual field are alternately arranged when seen in a cross sectional view.

The plane patterns of the pixels PL for left visual field and the pixels PR for right visual field are not particularly limited. For example, a pixel group for left visual field in line composed of a plurality of pixels PL for left visual field arranged in line and a pixel group for right visual field in line composed of a plurality of pixels PR for right visual field arranged in line are alternately arranged in stripe.

In the viewing side of the opposed substrate 106, there is formed a parallax barrier layer 108 including a light shielding part 108A and an opening part 108B. Although only one parallel barrier layer 108 is provided in the first exemplary embodiment, a plurality of parallel barrier layers 108 may be provided as required as in the patent document 2.

The parallax barrier layer 108 adjusts each display data from each of the pixels PL and PR forming the liquid crystal display apparatus 1 to be selectively emitted to the visual field of a specific angle range, so as to be able to display different display images on a plurality of visual fields having different angle ranges.

In the liquid crystal display apparatus 1, the position of the pixel opening part 107B formed between adjacent light shielding layers (BM) 107A and that of the opening part 108B in the parallax barrier layer 108 are deviated from each other. More specifically, the opening part 108B of the parallax barrier layer 108 is positioned between the pixel opening part 107B of the pixel PL for left visual field and the pixel opening part 107B of the pixel PR for right visual field that are adjacent to each other.

In the liquid crystal display apparatus 1, the display data from the pixel PL for left visual field passes through the pixel opening part 107B of the pixel PL for left visual field and the opening part 108B of the parallax barrier layer 108, and is selectively emitted to the left side with respect to the display screen. Hence, a display image IL for left visual field can be observed by an observer in the left side with respect to the display screen. For example, the display image IL is observed in the range in which the visual angle is moved by about 20 to 50° in the left side from the front.

Similarly, the display data from the pixel PR for right visual field passes through the pixel opening part 107B of the pixel PR for right visual field and the opening part 108B of the parallax barrier layer 108, and is selectively emitted to the right side with respect to the display screen. Hence, a display image IR for right visual field can be observed by an observer in the right side with respect to the display screen. For example, the display image IR is observed in the range in which the visual angle is moved by about 20 to 50° in the right side from the front.

In the liquid crystal display apparatus 1, the distance between the light shielding layer (BM) 107A and the parallax barrier layer 108, and the opening position and the opening diameter of the pixel opening part 107B and the opening part 108B of the parallax barrier layer 108 are designed such that the display data from the pixel PL for left visual field and the display data from the pixel PR for right visual field are emitted while being separated in angle.

In the first exemplary embodiment, as shown in FIGS. 1 and 3A, the parallax barrier layer 108 has a plane pattern including a plurality of opening parts 108B formed in a dotted checkered pattern and light shielding part 108A that is the other area than the opening parts 108B.

The plane pattern of the parallax barrier layer 108 is not limited to the example stated above, but may be any pattern as long as the patterns of the light shielding part 108A and the opening part 108B are designed such that the display image IL for left visual field is observed by the observer in the left side with respect to the display screen and the display image IR for right visual field is observed by the observer in the right side with respect to the display screen.

More specifically, it is only required that the opening part 108B of the parallax barrier layer 108 is positioned between the pixel opening part 107B of the pixel PL for left visual field and the pixel opening part 107B of the pixel PR for right visual field that are adjacent to each other. For example, as shown in FIG. 3B, the parallax barrier layer 108 may have a pattern in which a plurality of opening parts 108B are formed in stripe and the other area than the opening parts 108B is the light shielding part 108A.

As shown in FIG. 1, the liquid crystal display apparatus 1 according to the first exemplary embodiment further includes the linear polarizer 102a that selectively transmits a specific linearly-polarized light (P polarized light or S polarized light), and the viewing angle compensation film (Wide Viewing (WV) film) 103a that performs compensation so as to expand the view angle in this order from the side of the BL 101 between the BL 101 and the liquid crystal panel 2.

The liquid crystal display apparatus 1 according to the first exemplary embodiment further includes the viewing angle compensation film (Wide Viewing (WV) film) 103b that performs compensation so as to expand the view angle, and the linear polarizer 102b that selectively transmits a specific linearly-polarized light (P polarized light or S polarized light) in this order from the side of the liquid crystal panel 2 in the viewing side of the liquid crystal panel 2.

In the first exemplary embodiment, each of the linear polarizers 102a and 102b is an absorption-type linear polarizer that selectively transmits specific linearly-polarized light, and absorbs the linearly-polarized light in the polarizing axis that is orthogonal thereto. In the absorption-type linear polarizer, the polarizing axis (=polarizing axis of specific linearly-polarized light that is selectively transmitted) and the absorption axis (=polarizing axis of specific linearly-polarized light that is selectively absorbed) are orthogonal to each other.

Each of the linear polarizers 102a and 102b may be a reflective-type linear polarizer that selectively transmits specific linearly-polarized light, and reflects the linearly-polarized light in the polarizing axis that is orthogonal thereto.

In the first exemplary embodiment, each of the linear polarizers 102a and 102b includes a substrate of cellulose triacetate film (TAC, not shown).

Each of the viewing angle compensation films 103a and 103b is a phase difference compensation element such as a λ/4 plate (where "λ" indicates wavelength of light).

In the normal TN mode, the twist angle of the liquid crystal layer is set to 90°, and each direction of the polarizing axes of the pair of linear polarizers is designed to be substantially parallel or substantially vertical to the alignment direction of the liquid crystal molecules in each end face of the liquid crystal layer that is closer to each of the linear polarizers (the definition of "substantially parallel or substantially vertical" is described above).

In the first exemplary embodiment, the liquid crystal layer 105 is twist-aligned by about 90° when no electric field is applied, and has a Δnd value of 300 nm or larger and 400 nm or smaller, the Δnd value being a product of a refractive anisotropy Δn and a thickness of a liquid crystal layer d in a wavelength of 550 nm, each of the directions of the polarizing axes of the pair of linear polarizers 102a and 102b is substantially parallel or substantially vertical to the alignment direction of the liquid crystal molecules 105X in each end face of the liquid crystal layer 105 that is closer to each of the linear polarizers 102a and 102b, and the angle between the polarizing axes of the pair of linear polarizers 102a and 102b is designed to be 85° or larger and smaller than 90°.

In the first exemplary embodiment, it is possible to obtain the liquid crystal display apparatus 1 in which the CR in the frontal visual field and the neighboring visual field is relatively low and the CR in a desired slanted visual field (for example, a range in which the visual angle is moved by about 20 to 50° in the left side and the right side from the front) is relatively high by setting the design conditions as stated above.

Table 1 shows design examples of angles of the absorption axes of the linear polarizers 102a and 102b, alignment angles of the viewing angle compensation films 103a and 103b, and alignment angles of the liquid crystal layer 105 when no electric field is applied (=rubbing angle of the alignment film) in the liquid crystal display apparatus 1 according to the first exemplary embodiment.

TABLE 1

| | ANGLE(°) | PHASE DIFFERENCE (OPTICAL DATA WITH WAVELENGTH OF 550 nm) |
|---|---|---|
| LINEAR POLARIZER 102b | ABSORPTION AXIS: +43 | |
| SUBSTRATE TAC OF LINEAR POLARIZER 102b | SLOW AXIS: +43 | Re = 4 nm, Rth = 40 nm |
| VIEWING ANGLE COMPENSATION FILM 103b | ALIGNMENT ANGLE: +43 | Re = 43 nm, Rth = 155 nm |
| LIQUID CRYSTAL LAYER 105 | ALIGNMENT ANGLE (VIEWING SIDE): +43 ALIGNMENT ANGLE (BL SIDE): −43 | Δnd = 375 nm |
| VIEWING ANGLE COMPENSATION FILM 103a | ALIGNMENT ANGLE: −43 | Rth = 43 nm, Rth = 155 nm |
| SUBSTRATE TAC OF LINEAR POLARIZER 102a | SLOW AXIS: −43 | Re = 4 nm, Rth = 40 nm |
| LINEAR POLARIZER 102a | ABSORPTION AXIS: −43 | |

The definitions of the terms "angle" and "Δnd value" in this specification are described above.

In this specification, unless otherwise noted, "Re" indicates a retardation value in the plane having a wavelength of 550 nm, and "Rth" indicates a retardation value in the thickness direction of the same wavelength.

Figure 4:
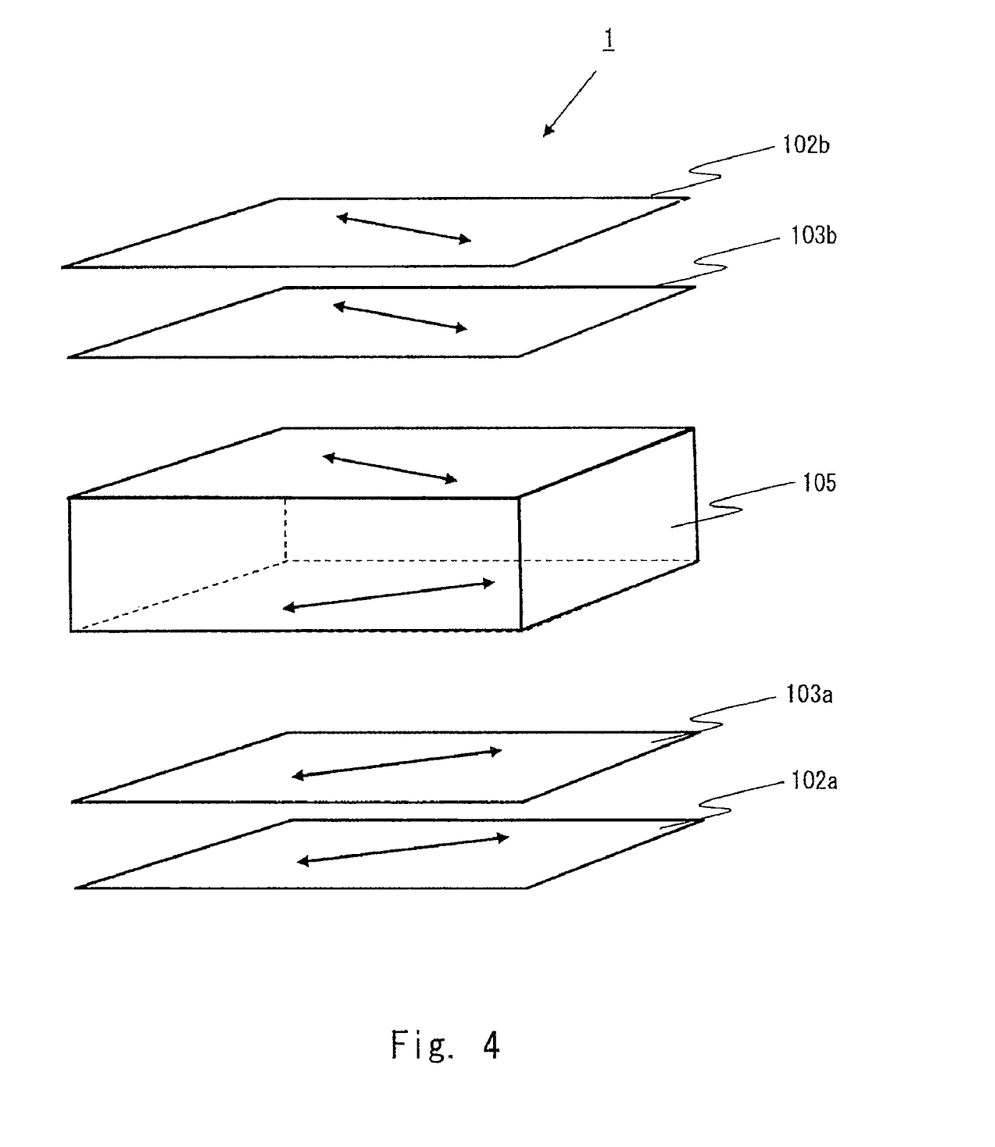
FIG. 4 is an exploded perspective view specifically showing main constitutional elements of the liquid crystal display apparatus shown in FIG. 1.
Figure 5:
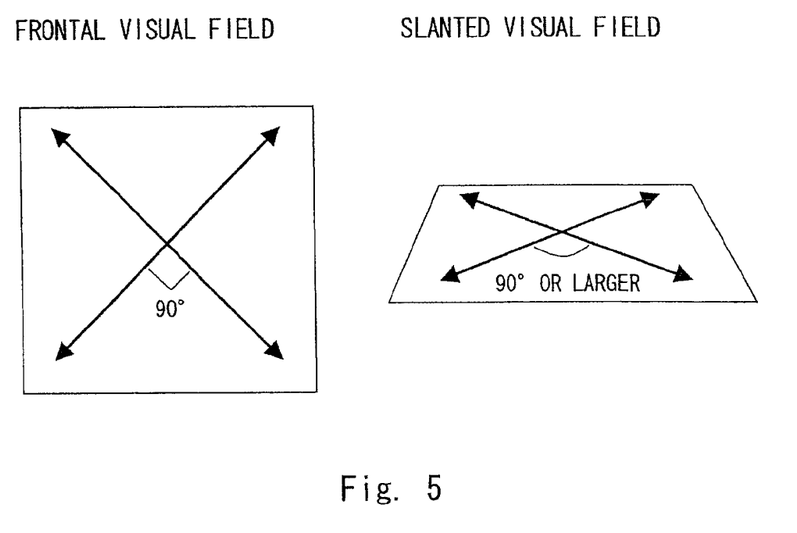
FIG. 5 shows schematic views of a pair of linear polarizers that are in a cross-nicol relationship in the normal TN mode seen from a frontal visual field and from a slanted visual field.
Figure 6:
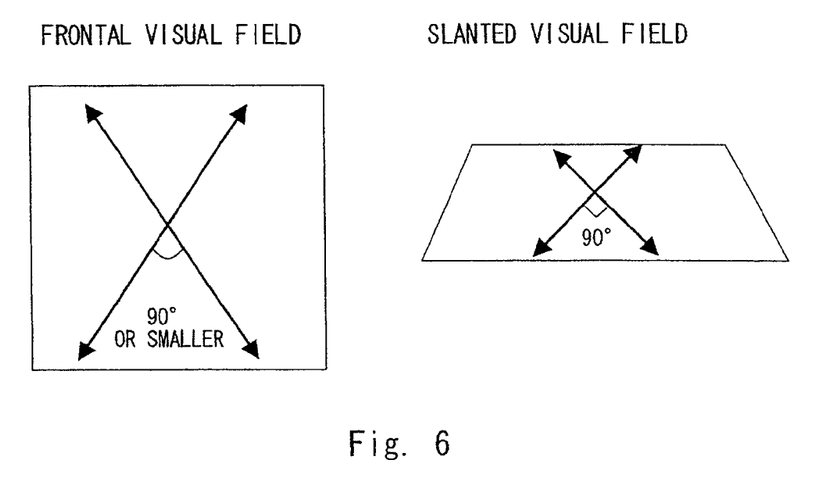
FIG. 6 shows schematic views of a pair of linear polarizers in the liquid crystal display apparatus shown in FIG. 1 seen from a frontal visual field and from a slanted visual field.

Referring to FIGS. 4 to 6, the reason will be described why it is possible to obtain the liquid crystal display apparatus 1 in which the CR around the front is relatively low and the CR in the direction of the desired visual field (for example, a range in which the visual angle is moved by about 20 to 50° in the left side and the right side from the front) is relatively high by designing the above parameters.

FIG. 4 is an exploded perspective view specifically showing main constitutional elements of the liquid crystal display apparatus 1 shown in FIG. 1.

The left view of FIG. 5 is a schematic view of the pair of linear polarizers that are in a cross-nicol relationship in the normal TN mode seen from the frontal visual field, and the right view of FIG. 5 is a schematic view of the pair of linear polarizers that are in a cross-nicol relationship in the normal TN mode seen from the slanted visual field. FIG. 5 shows the pair of linear polarizers that are overlapped with each other. The arrows in FIG. 5 show the absorption axes of the pair of linear polarizers.

In the liquid crystal display apparatus with single screen in the normal TN mode, the gradation inversion direction of blocked up shadows is generated in a direction in which liquid crystal molecules are raised. Thus, both of the alignment angle of the liquid crystal layer 105 in the BL side and the alignment angle of the liquid crystal layer 105 in the viewing side when no electric field is applied are typically set to the direction of about +45° or −45°, so as to set the gradation inversion direction in the vertical direction. Otherwise, the gradation inversion occurs in any one of the right and left directions, which emphasizes asymmetry of right and left views.

Accordingly, even in a display apparatus with right and left two screens including the main visual angle area in the lateral direction, it is preferable that both of the alignment angle of the liquid crystal layer 105 in the BL side and the alignment angle of the liquid crystal layer 105 in the viewing side when no electric field is applied are set to the direction of about +45° or to the direction of about −45°.

In the first exemplary embodiment, both of the alignment angle of the liquid crystal layer 105 in the BL side and the alignment angle of the liquid crystal layer 105 in the viewing side when no electric field is applied are set to the direction of about +45° or −45°.

In the design example shown in Table 1, the alignment angle of the liquid crystal layer 105 in the BL side and the alignment angle of the liquid crystal layer 105 in the viewing side when no electric field is applied are set to −43° and +43°, respectively.

In the TN mode, the polarizing axis of the linear polarizer 102a in the BL side needs to be made substantially parallel to or substantially orthogonal to the direction in which the liquid crystal molecules 105X are aligned (=longitudinal direction of liquid crystal molecules) in the end face of the liquid crystal layer 105 in the BL side when no electric field is applied. The polarizing axis of the linear polarizer 102b in the viewing side needs to be made substantially parallel to or substantially orthogonal to the direction in which the liquid crystal molecules 105X are aligned in the end face of the liquid crystal layer 105 in the viewing side when no electric field is applied.

In the typical TN mode, the absorption axis of the linear polarizer in the BL side is often made substantially parallel to the direction in which the liquid crystal molecules are aligned in the end face of the liquid crystal layer in the BL side when no electric field is applied, and the absorption axis of the linear polarizer in the viewing side is often made substantially parallel to the direction in which the liquid crystal molecules are aligned in the end face of the liquid crystal layer in the viewing side when no electric field is applied. Accordingly, both of the absorption axes of the linear polarizers in the BL side and the viewing side are often set to the direction of about +45° or −45° in accordance with the alignment angle of the liquid crystal layer. Further, it is typical in the normal TN mode that the pair of linear polarizers are arranged such that the polarizing axes are orthogonal to each other (cross-nicol arrangement).

In the first exemplary embodiment, each angle of the absorption axes of the pair of linear polarizers 102a and 102b is made coincide with the alignment angle of the liquid crystal molecules 105X in each end face of the liquid crystal layer 105 that is closer to each of the linear polarizers 102a and 102b when no electric field is applied.

In the design example shown in Table 1, the angle between the absorption axis of the linear polarizer 102a in the BL side is set to −43° in accordance with the alignment angle of the liquid crystal layer 105 when no electric field is applied, and the angle between the absorption axis of the linear polarizer 102b in the viewing side is set to +43° in accordance with the alignment angle of the liquid crystal layer 105 when no electric field is applied.

In the typical TN mode, it is generally performed that the absorption axes of the pair of linear polarizers are made orthogonal with each other (cross-nicol relationship), the liquid crystal molecules in the end face of the liquid crystal layer in the BL side when no electric field is applied are aligned substantially parallel to the absorption axis of the linear polarizer in the BL side, and the liquid crystal molecules in the end face of the liquid crystal layer in the viewing side when no electric field is applied are aligned substantially parallel to the absorption axis of the linear polarizer in the viewing side.

When an electric field is applied to the liquid crystal layer that is aligned as above, the liquid crystal molecules are aligned to be substantially vertical to the substrate, which loses optical rotation of liquid crystals, and the linearly-polarized light that passes through the linear polarizer in the BL side is completely shielded by the other linear polarizer in the viewing side having the cross-nicol relationship. The absorption axes of the pair of linear polarizers are made orthogonal to each other (cross-nicol relationship) in order to increase CR in the frontal visual field.

In the first exemplary embodiment, when seen from the front, the angle between the absorption axes of the pair of linear polarizers 102a and 102b is deviated from 90° (cross-nicol relationship). Thus, the CR in the neighborhood of the front decreases compared to that in the normal TN mode.

In the normal TN mode, as shown in FIG. 5, in the visual angle in the slanted direction, when the visual angle is moved in the lateral direction from the front in the direction that is intermediate between the absorption axes of the pair of linear polarizers (direction calculated by rotating one absorption axis by 45°), the apparent angle of the absorption axes of the pair of linear polarizers from the frontal visual field varies. When the angle between the absorption axes of the pair of linear polarizers in the frontal visual field is 90° (cross-nicol relationship), the angle between the absorption axes of the pair of linear polarizers in the slanted visual field apparently becomes wider than 90°, the cross-nicol relationship is lost, light leakage occurs in the visual angle, which lowers the CR.

In the first exemplary embodiment, the angle between the absorption axes of the pair of linear polarizers 102a and 102b is designed to be 85° or larger and smaller than 90°.

Assume that, in such a design condition, in the visual angle in the slanted direction, the visual angle is moved from the front in the direction that is intermediate between the absorption axes of the pair of linear polarizers 102a and 102b (direction rotated by 45° from one absorption axis). Then, the angle between the absorption axes of the pair of linear polarizers 102a and 102b apparently approaches 90° (cross-nicol relationship) as shown in FIG. 6. The angle between the absorption axes of the pair of linear polarizers 102a and 102b can be made completely 90° (cross-nicol relationship) or extremely close to 90° in a desired slanted visual field. In this case, light leakage does not occur in the visual angle range, and the CR can be made high in a desired slanted visual field.

It is only required that the alignment angle of the liquid crystal molecules 105X in each of the upper and lower end faces of the liquid crystal layer 105 when no electric field is applied is substantially parallel or substantially vertical to each of the absorption axes of the linear polarizers 102a and 102b that is closer thereto. It is made substantially parallel in the first exemplary embodiment.

Assume that, in the design example shown in Table 1, the alignment angle of the liquid crystal molecules 105X in each of the upper and lower end faces of the liquid crystal layer 105 when no electric field is applied is set to the same angle of each of the absorption axes of the linear polarizers 102a and 102b that is closer thereto. However, the alignment angle may be deviated from the angle between each of the absorption axes of the linear polarizers 102a and 102b that is closer thereto by the range of ±5°. Such a deviation does not give any influence on the optical properties.

The cell gap in the first exemplary embodiment may be the same range as that of the TN mode according to the related art, and the Δnd value in the wavelength of 550 nm of the liquid crystal layer 105 is designed to be 300 nm or larger and 400 nm or smaller. The Δnd value is set to 375 nm in the design condition shown in Table 1.

Figure 7:
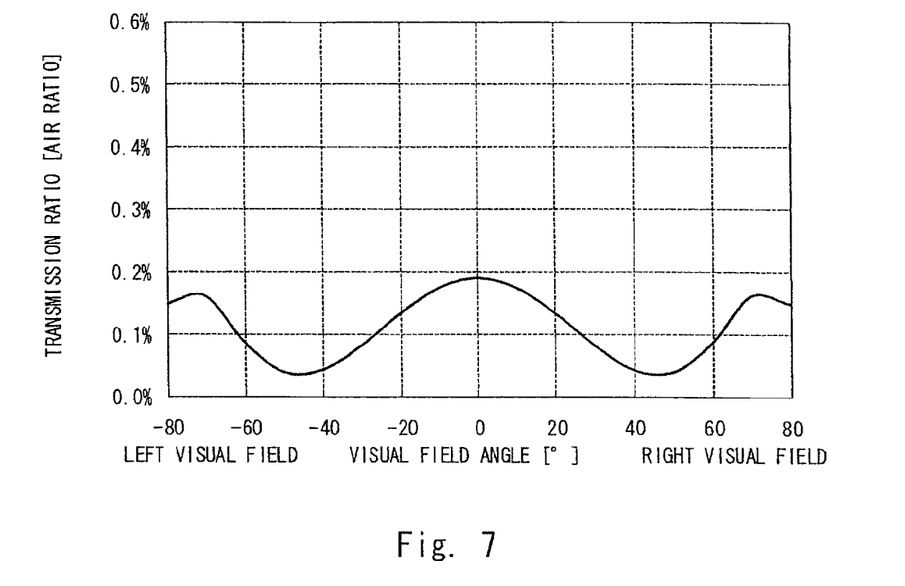
FIG. 7 is a graph showing a calculation result of a viewing angle characteristic of a transmission ratio of a liquid crystal display apparatus upon display of black in the liquid crystal display apparatus shown in FIG. 1.
Figure 8:
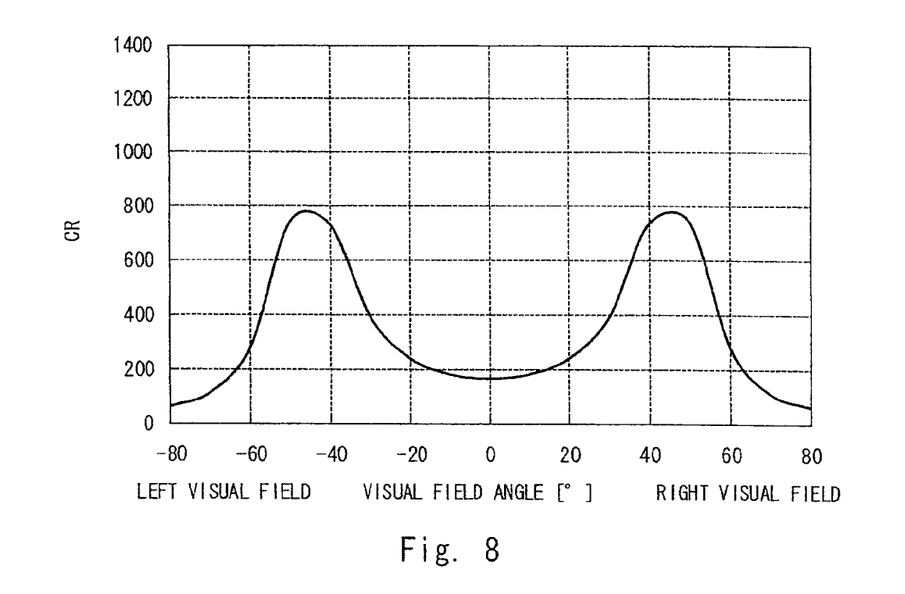
FIG. 8 is a graph showing a calculation result of a viewing angle characteristic of a CR in the liquid crystal display apparatus shown in FIG. 1.

The calculation results of the viewing angle characteristics when the liquid crystal display apparatus 1 is designed under the condition of Table 1 are shown in FIGS. 7 and 8. As a comparative example, the calculation results of the viewing angle characteristics of the liquid crystal display apparatus in the TN mode according to the related art are shown in FIGS. 9 and 10.

In the liquid crystal display apparatus in the TN mode according to the related art, calculation is made by setting the twist angle of the liquid crystal to 90°, the angle between the absorption axes of the pair of linear polarizers to 90°, and the Δnd value to 375 nm. The calculation is made in the liquid crystal display apparatus 1 under the same condition as that of the liquid crystal display apparatus according to the related TN mode except the design conditions shown in Table 1.

Figure 9:
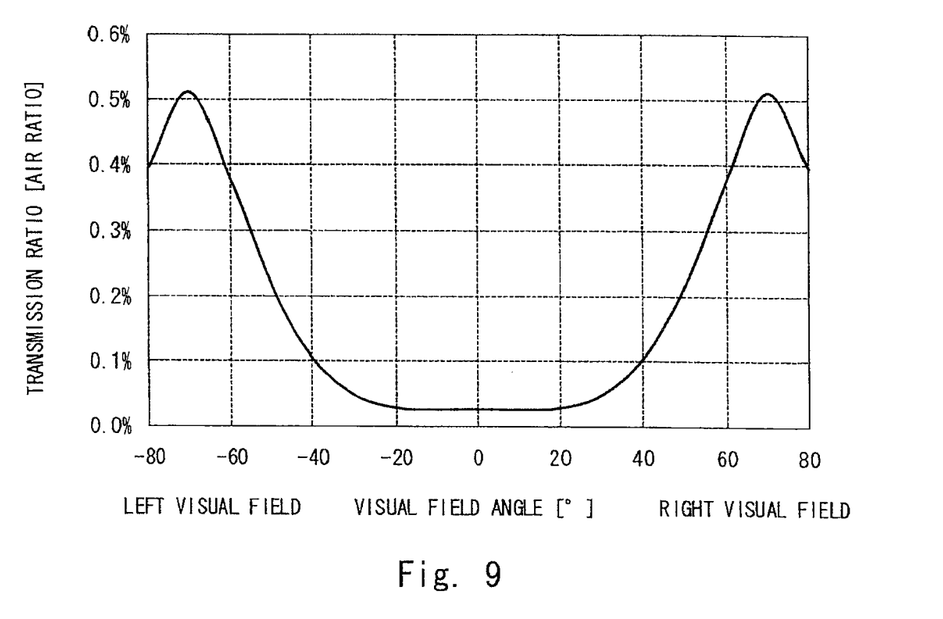
FIG. 9 is a graph showing a calculation result of a viewing angle characteristic of a transmission ratio of a liquid crystal display apparatus upon display of black in a normal TN mode.
Figure 10:
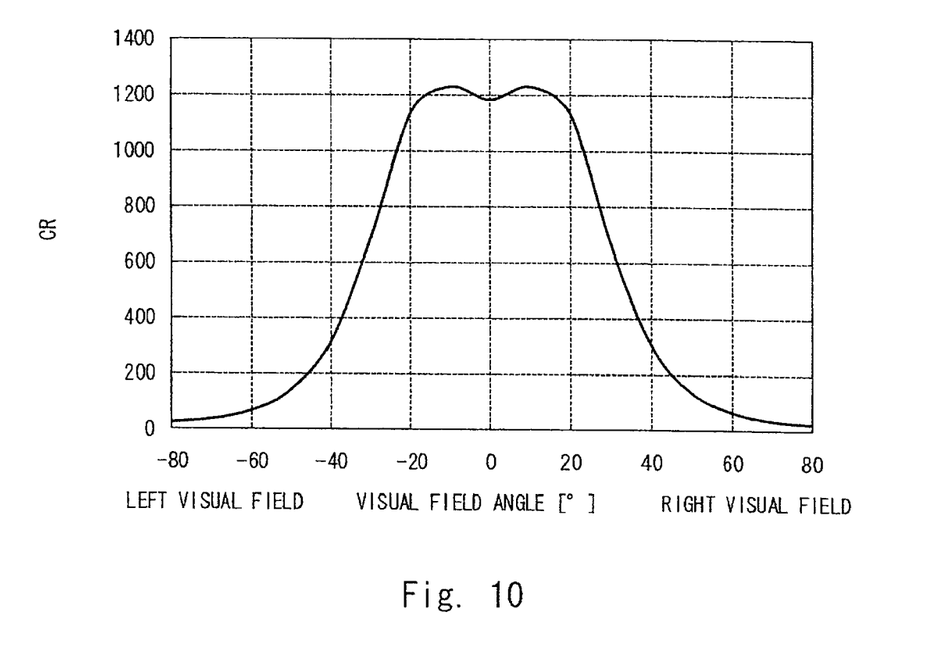
FIG. 10 is a graph showing a calculation result of a viewing angle characteristic of a CR in the normal TN mode.

FIGS. 7 and 9 are calculation results of visual angle dependencies of a transmission ratio of the liquid crystal display apparatus upon display of black. FIGS. 8 and 10 are calculation results of visual angle dependencies of CR. In each diagram, the visual angle direction is the lateral direction.

As shown in FIGS. 7 to 10, in the frontal visual field and the neighboring visual field, the liquid crystal display apparatus 1 according to the first exemplary embodiment has a relatively high transmission ratio upon display of black, which results in the relatively low CR in the frontal visual field and the neighboring field. Although the degree of mixing the two display images IL and IR is relatively high in the frontal visual field, the mixed image is hardly visualized since the CR is low even if the other image is mixed.

In the slanted visual field in which the visual angle is moved by about 20 to 50° in the lateral direction from the frontal visual field, the liquid crystal display apparatus 1 in the first exemplary embodiment has higher CR than that of the related TN mode. Accordingly, the slanted visual field in which the image is most likely to be observed in the two-screen display device achieves display properties with high CR and small deviation of gamma characteristic.

As stated above, in the first exemplary embodiment, the degree that the two display images IL and IR are mixed is large especially in the frontal visual field and the neighboring visual field. Accordingly, CR is reduced in the frontal visual field and the neighboring visual field, and even when the other display image is mixed with the display image which should be visualized by the user, the luminance level of the display image which should be visualized is made higher than the luminance level of the mixed display image, whereby the mixed display image is hardly visualized by the user. On the other hand, excellent display properties with high CR can be obtained in a desired slanted visual field.

In the first exemplary embodiment, there is no need to calculate the correction amount by estimating the crosstalk in advance and to reflect the correction amount in the drive circuit unlike the patent document 1. Furthermore, there is no need to provide a plurality of parallax barrier layers unlike the patent document 2.

Hence, according to the first exemplary embodiment, it is possible to provide the liquid crystal display apparatus 1 of parallax barrier system which is capable of reducing crosstalk in the plurality of display images in a desired visual field without complicating the circuit configuration, without requiring a plurality of parallax barrier layers, with low cost, high contrast ratio, and excellent visibility.

As described above, although it is not necessary to provide a plurality of parallax barrier layers 108 in the first exemplary embodiment, a plurality of parallax barrier layers 108 may be arranged as in the patent document 2.

While the first exemplary embodiment is effective for a liquid crystal display apparatus of parallax barrier system, it is applicable to any liquid crystal display apparatus with the desired visual field of the slanted direction with respect to the display screen, and it is possible to provide a liquid crystal display apparatus with high contrast ratio and excellent visibility.

Second Exemplary Embodiment

A liquid crystal display apparatus of parallax barrier system with multi-screen display according to a second exemplary embodiment of the present invention will be described. The second exemplary embodiment will also be described taking a display apparatus with right and left two screens as an example.

The liquid crystal display apparatus according to the second exemplary embodiment has the similar basic configuration as that in the first exemplary embodiment, and is a transmissive liquid crystal display apparatus including a back light (BL) as is similar to the first exemplary embodiment. The liquid crystal display apparatus in the second exemplary embodiment is different from that in the first exemplary embodiment in that the mode is the VA (Vertical Alignment) mode in which the liquid crystals are aligned in the substantially vertical direction when no electric field is applied.

Since the basic configuration in the second exemplary embodiment is similar to that in the first exemplary embodiment, description will be made with reference to the drawings and signals in the first exemplary embodiment.

Although the VA mode has the advantage that the CR in the frontal visual field can be made extremely high, this advantage may cause a disadvantage in the display apparatus of parallax barrier system with multi screen. This is because, as described in the "Description of Related Art", especially in the neighborhood of the boundary that separates a plurality of display images (in case of a right and left two-screen display, a visual angle in the front or in a small angle that is close to the front), there is a high possibility that the other display image that should not be visualized leaks into the display image that should be visualized. In this case, when the other bright image is mixed to the visual field that displays black image, the mixed bright image tends to be relatively visualized because high CR results in low luminance of black that should be observed.

The second exemplary embodiment achieves the characteristic in which the CR is relatively low in the frontal visual field and the neighboring visual field with small angle and the CR is relatively high in a desired slanted visual field when the VA mode is applied to the display apparatus with right and left two screens of parallax barrier system.

In the second exemplary embodiment, the liquid crystal layer 105 is aligned substantially vertically when no electric field is applied, and the angle between the polarizing axes of the pair of linear polarizers 102a and 102b is designed to be 85° or larger and smaller than 90°.

In the typical liquid crystal display apparatus in the VA mode, each angle of the absorption axes of the pair of linear polarizers is set to 0° or 90°, and the angle between the absorption axes of the pair of linear polarizers is designed to be 0° or +90° (the definition of "angle" in this specification is described above).

In the second exemplary embodiment, each angle of the absorption axes of the pair of linear polarizers 102a and 102b is designed to be about +45 or −45°, and the angle between the absorption axes of the pair of linear polarizers 102a and 102b is designed to be 85° or larger and smaller than 90°.

In the second exemplary embodiment, it is possible to obtain the liquid crystal display apparatus in which the CR in the frontal visual field and the neighboring visual field is relatively low and the CR in a desired slanted visual field (the range that moves the visual angle by about 20 to 50° in the left side and the right side from the front, for example) is relatively high by setting the design conditions as stated above. The reason thereof is similar to that described in the first exemplary embodiment.

A design example in the second exemplary embodiment will be shown in Table 2.

TABLE 2

| | ANGLE(°) | PHASE DIFFERENCE (OPTICAL DATA WITH WAVELENGTH OF 550 nm) |
|---|---|---|
| LINEAR POLARIZER 102b | ABSORPTION AXIS: +44 | |
| SUBSTRATE TAC OF LINEAR POLARIZER 102b | SLOW AXIS: +44 | Re = 10 nm, Rth = 70 nm |
| LIQUID CRYSTAL LAYER 105 | NO ALIGNMENT ANGLE BECAUSE OF VERTICAL | Δnd = 270 nm |
| SUBSTRATE TAC OF LINEAR POLARIZER 102a | SLOW AXIS: −44 | Re = 10 nm, Rth = 70 nm |
| LINEAR POLARIZER 102a | ABSORPTION AXIS: 44 | |

The definitions of "angle", "Re", "Rth", and "Δnd" in this specification are described above.

Figure 11:
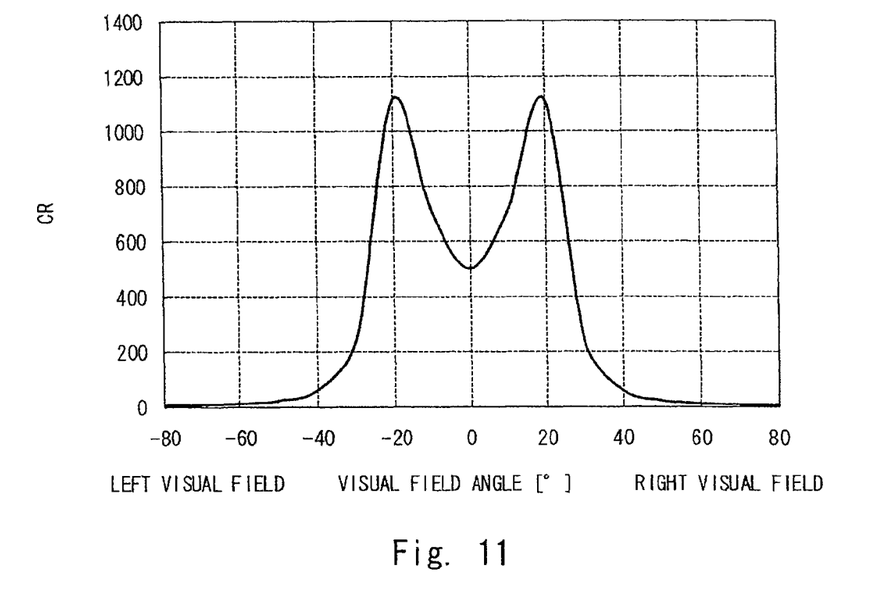
FIG. 11 is a graph showing a calculation result of a viewing angle characteristic of a CR in a liquid crystal display apparatus of parallax barrier system with multi screen according to a second exemplary embodiment of the present invention.

FIG. 11 shows a calculation result of a viewing angle characteristic of CR (lateral direction) when the liquid crystal display apparatus is designed in the conditions shown in Table 2. In FIG. 11, calculation is performed in the VA mode with the lowest cost with only TAC compensation, based on the multi-domain VA mode divided by four. Since both of the angles of the absorption axes of the pair of linear polarizers 102a and 102b are set to the direction of about 45°, the calculation is performed in four directions of 0°, 45°, 90°, and 135°, the directions indicating the liquid crystal molecules being inclined when the electric field is applied. While the CR is low in the frontal visual field and the neighboring visual field, the CR is high in the point moving the visual angle by about 20° in the lateral direction from the front. Thus, display properties with high CR and small deviation of gamma characteristic can be obtained in a desired slanted visual field.

According to the second exemplary embodiment, it is possible to provide a liquid crystal display apparatus of parallax barrier system which is capable of reducing crosstalk in the plurality of display images in the desired visual field without complicating the circuit configuration, without requiring a plurality of parallax barrier layers, with low cost, high contrast ratio, and excellent visibility.

As described above, although it is not necessary to provide a plurality of parallax barrier layers 108 in the second exemplary embodiment, a plurality of parallax barrier layers 108 may be arranged as in the patent document 2.

While the second exemplary embodiment is effective for a liquid crystal display apparatus of parallax barrier system, it is applicable to any liquid crystal display apparatus with the desired visual field of the slanted direction with respect to the display screen, and it is possible to provide a liquid crystal display apparatus with high contrast ratio and excellent visibility.

Third Exemplary Embodiment

A liquid crystal display apparatus of parallax barrier system with multi-screen display according to a third exemplary embodiment of the present invention will be described. The third exemplary embodiment will also be described taking a display apparatus with right and left two screens as an example.

A basic configuration of the liquid crystal display apparatus according to the third exemplary embodiment is similar to that of the first exemplary embodiment. The liquid crystal display apparatus according to the third exemplary embodiment is a transmissive liquid crystal display apparatus including a back light (BL) as is similar to the first exemplary embodiment. The liquid crystal display apparatus according to the third exemplary embodiment is different from that of the first exemplary embodiment in that the mode is the IPS (In-Plane Switching) mode or the FFS (Fringe Field Switching) mode which is the liquid crystal mode of the lateral electric field drive system. In these modes, both of the pixel electrode and the opposed electrode are formed in one substrate side.

Since the basic configuration of the third exemplary embodiment is similar to that of the first exemplary embodiment, description will be made with reference to the drawings and the symbols of the first exemplary embodiment.

The IPS mode or the FFS mode has the advantage of high CR viewing angle characteristic. However, it has high CR in the frontal visual field and the neighboring visual field. Thus, when it is used as the display apparatus of parallax barrier system with multi screen, as described in the "Description of Related Art", crosstalk of a plurality of display images is easily visualized according to the related configuration.

The third exemplary embodiment achieves the characteristic in which the CR in the frontal visual field and the visual field with small angle that is close to the front is relatively low and the CR in a desired slanted visual field is relatively high when the IPS mode or the FFS mode is used in the display apparatus with multi screen.

In the third exemplary embodiment, the liquid crystal layer 105 is uniaxially aligned when no electric field is applied, the uniaxial alignment angle is larger than −45° and −40° or smaller, or +40° or larger and smaller than +45° (the definition of "angle" is described above), and the direction of the polarizing axes of the pair of linear polarizers 102a and 102b is designed to be substantially parallel or substantially vertical with respect to the uniaxial alignment direction of the liquid crystal layer 105.

In the liquid crystal display apparatus of normal IPS mode or FFS mode, each angle of the absorption axes of the pair of linear polarizers is designed to be 0° or +90°. In the third exemplary embodiment, each angle of the absorption axes of the pair of linear polarizers is designed substantially to be +45° or −45°.

In the third exemplary embodiment, it is possible to obtain the liquid crystal display apparatus in which the CR in the frontal visual field and the neighboring visual field is relatively low and the CR in a desired slanted visual field (the range of moving the visual angle by about 20 to 50° in the left side and the right side from the front, for example) is relatively high by setting the design conditions as stated above.

A design example in the third exemplary embodiment will be shown in Table 3.

TABLE 3

| | ANGLE(°) | PHASE DIFFERENCE |
|---|---|---|
| LINEAR POLARIZER 102b | ABSORPTION AXIS: +43 | |
| SUBSTRATE TAC OF LINEAR POLARIZER 102b | SLOW AXIS: +43 | Re = 5 nm, Rth = 35 nm |
| LIQUID CRYSTAL LAYER 105 | ALIGNMENT ANGLE: +43 | $\Delta nd$ = 270 nm (CORRESPONDING WAVELENGTH: 550 nm) |
| SUBSTRATE TAC OF LINEAR POLARIZER 102a | SLOW AXIS: −43 | Re = 5 nm, Rth = 35 nm |
| LINEAR POLARIZER 102a | ABSORPTION AXIS: −43 | |

The definitions of "angle", "Re", "Rth", and "$\Delta nd$" in this specification are described above.

The principle that the CR in the frontal visual field and the neighboring visual field is relatively low and the CR in the desired slanted visual field is relatively high is different from that in the first and second exemplary embodiments.

Since the phase difference ($\Delta nd$ value) of the liquid crystal layer 105 is designed to be extremely larger (e.g., 270 nm) in the IPS mode or the FFS mode than other modes, the influence of the phase difference ($\Delta nd$ value) of the liquid crystal layer 105 becomes large in the slanted visual field in which the phase difference of the liquid crystal layer 105 increases.

The angle between the absorption axes of the pair of linear polarizers 102a and 102b is the dominant factor of the design parameter that makes the CR in the frontal visual field and the neighboring visual field lower and makes the CR in the desired slanted visual field higher in the first exemplary embodiment in the TN mode and the second exemplary embodiment in the VA mode. In the IPS mode or the FFS mode, the dominant factor is the uniaxial alignment angle of the liquid crystal layer 105 when no electric field is applied. In the third exemplary embodiment, the uniaxial alignment angle of the liquid crystal layer 105 when no electric field is applied is designed to be substantially the direction of +45° or −45°.

It is only required that the absorption axes of the linear polarizers 102a and 102b are substantially parallel to or substantially vertical to the uniaxial alignment direction of the liquid crystal layer 105 when no electric field is applied. Although the absorption axes of the pair of linear polarizers 102a and 102b are set to the value that is equal to the uniaxial alignment angle of the liquid crystal layer 105 when no electric field is applied in the design example shown in Table 3, it may be deviated in the range of ±5°. Such a slight deviation of this range hardly gives an influence on the optical properties.

Figure 12:
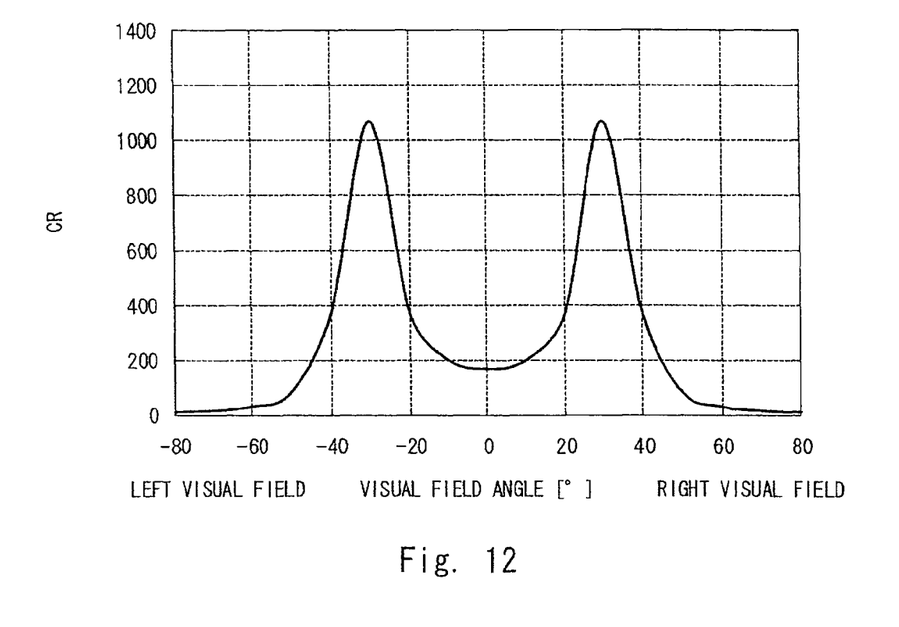
FIG. 12 is a graph showing a calculation result of a viewing angle characteristic of a CR in a liquid crystal display apparatus of parallax barrier system with multi screen according to a third exemplary embodiment of the present invention.

FIG. 12 shows a calculation result of a viewing angle characteristic (lateral direction) of a CR when the liquid crystal display apparatus is designed in the conditions shown in Table 3. While the CR is relatively low in the frontal visual field and the neighboring visual field, high CR is obtained in the point moving the visual field by about 30° in the lateral direction from the frontal visual field. Hence, display properties can be obtained with high CR and small deviation of gamma characteristic in the desired slanted visual field.

According to the third exemplary embodiment, it is possible to provide a liquid crystal display apparatus of parallax barrier system which is capable of reducing crosstalk in the plurality of display images in the desired visual field without complicating the circuit configuration, without requiring a plurality of parallax barrier layers, with low cost, high contrast ratio, and excellent visibility.

As described above, although it is not necessary to provide a plurality of parallax barrier layers 108 in the third exemplary embodiment, a plurality of parallax barrier layers 108 may be arranged as in the patent document 2.

While the third exemplary embodiment is effective for a liquid crystal display apparatus of parallax barrier system, it is applicable to any liquid crystal display apparatus with the desired visual field of the slanted direction with respect to the display screen, and it is possible to provide a liquid crystal display apparatus with high contrast ratio and excellent visibility.

Design Changes

The present invention is not limited to the above-described exemplary embodiments, but its design may be changed without departing from the spirit of the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display apparatus comprising:
a liquid crystal layer;
a pair of substrates that are arranged opposite to each other with the liquid crystal layer interposed therebetween, each of the substrates comprising an electrode to apply an electric field to the liquid crystal layer; and
a pair of linear polarizers that are arranged outside the pair of substrates, each of the linear polarizers selectively transmitting specific linearly-polarized light, wherein
the liquid crystal layer is twist-aligned when no electric field is applied, and has a $\Delta nd$ value of 300 nm or larger and 400 nm or smaller, the $\Delta nd$ value being a product of a refractive anisotropy $\Delta n$ and a thickness of a liquid crystal layer d in a wavelength of 550 nm,
each of directions of polarizing axes of the pair of linear polarizers is substantially parallel or substantially vertical to the alignment direction of liquid crystal molecules in each end face of the liquid crystal layer that is closer to each of the linear polarizers, and
the angle between the polarizing axes of the pair of linear polarizers is 85° or larger and smaller than 90°.

2. A liquid crystal display apparatus comprising:
a liquid crystal layer;
a pair of substrates that are arranged opposite to each other with the liquid crystal layer interposed therebetween, each of the substrates comprising an electrode to apply an electric field to the liquid crystal layer; and
a pair of linear polarizers that are arranged outside the pair of substrates, each of the linear polarizers selectively transmitting specific linearly-polarized light, wherein
the liquid crystal layer is aligned to be substantially vertical when no electric field is applied, and
the angle between polarizing axes of the pair of linear polarizers is 85° or larger and smaller than 90°.

3. A liquid crystal display apparatus of a lateral electric field drive system comprising:
a liquid crystal layer;
a pair of substrates that are arranged opposite to each other with the liquid crystal layer interposed therebetween;
a pair of linear polarizers that are arranged outside the pair of substrates, each of the linear polarizers selectively transmitting specific linearly-polarized light; and a pair of electrodes that are included in one substrate of the pair of substrates, the electrodes applying lateral electric field to the liquid crystal layer, wherein the liquid crystal layer is uniaxially aligned when no electric field is applied, and the uniaxial alignment angle is larger than −45° and −40° or smaller, or +40° or larger and smaller than +45° (the "angle" here is a value based on 0° which is the direction of three-o'clock of a clock seen from a front with respect to a display screen, the counterclockwise direction from 0° being "+", and the clockwise direction from 0° being "−"), and the direction of the polarizing axes of the pair of linear polarizers is substantially parallel or substantially vertical to the uniaxial alignment direction of the liquid crystal layer.

4. The liquid crystal display apparatus according to claim 1, comprising at least one parallax barrier layer provided in a substrate in a viewing side of the pair of substrates, the parallax barrier layer performing adjustment so that each display data from each of pixels forming the liquid crystal display apparatus is selectively emitted to a visual field of a specific angle range, to perform adjustment so that different display images are displayed on a plurality of visual fields having different angle ranges.

5. The liquid crystal display apparatus according to claim 2, comprising at least one parallax barrier layer provided in a substrate in a viewing side of the pair of substrates, the parallax barrier layer performing adjustment so that each display data from each of pixels forming the liquid crystal display apparatus is selectively emitted to a visual field of a specific angle range, to perform adjustment so that different display images are displayed on a plurality of visual fields having different angle ranges.

6. The liquid crystal display apparatus according to claim 3, comprising at least one parallax barrier layer provided in a substrate in a viewing side of the pair of substrates, the parallax barrier layer performing adjustment so that each display data from each of pixels forming the liquid crystal display apparatus is selectively emitted to a visual field of a specific angle range, to perform adjustment so that different display images are displayed on a plurality of visual fields having different angle ranges.

* * * * *